Feb. 24, 1959

J. R. ROEHRIG 2,874,899

DISCRIMINATING PLURAL COUNTER ASSEMBLY OF FIBERS

Filed March 7, 1955

2 Sheets-Sheet 1

INVENTOR.
Jonathan R. Roehrig
BY
Oliver W. Hayes
ATTORNEY

United States Patent Office 2,874,899
Patented Feb. 24, 1959

2,874,899

DISCRIMINATING PLURAL COUNTER ASSEMBLY OF FIBERS

Jonathan R. Roehrig, South Sudbury, Mass., assignor to National Research Corporation, Cambridge, Mass., a corporation of Massachusetts Application March 7, 1955, Serial No. 492,716

3 Claims. (Cl. 235—92)

This invention relates to measuring and in particular to the measuring of fibers.

A principal object of this invention is to provide an apparatus for readily and accurately measuring the average diameter and diameter distribution of fibers.

Another object of the invention is to provide an improved counter circuit which is capable of both adding and subtracting.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

Figure 1:
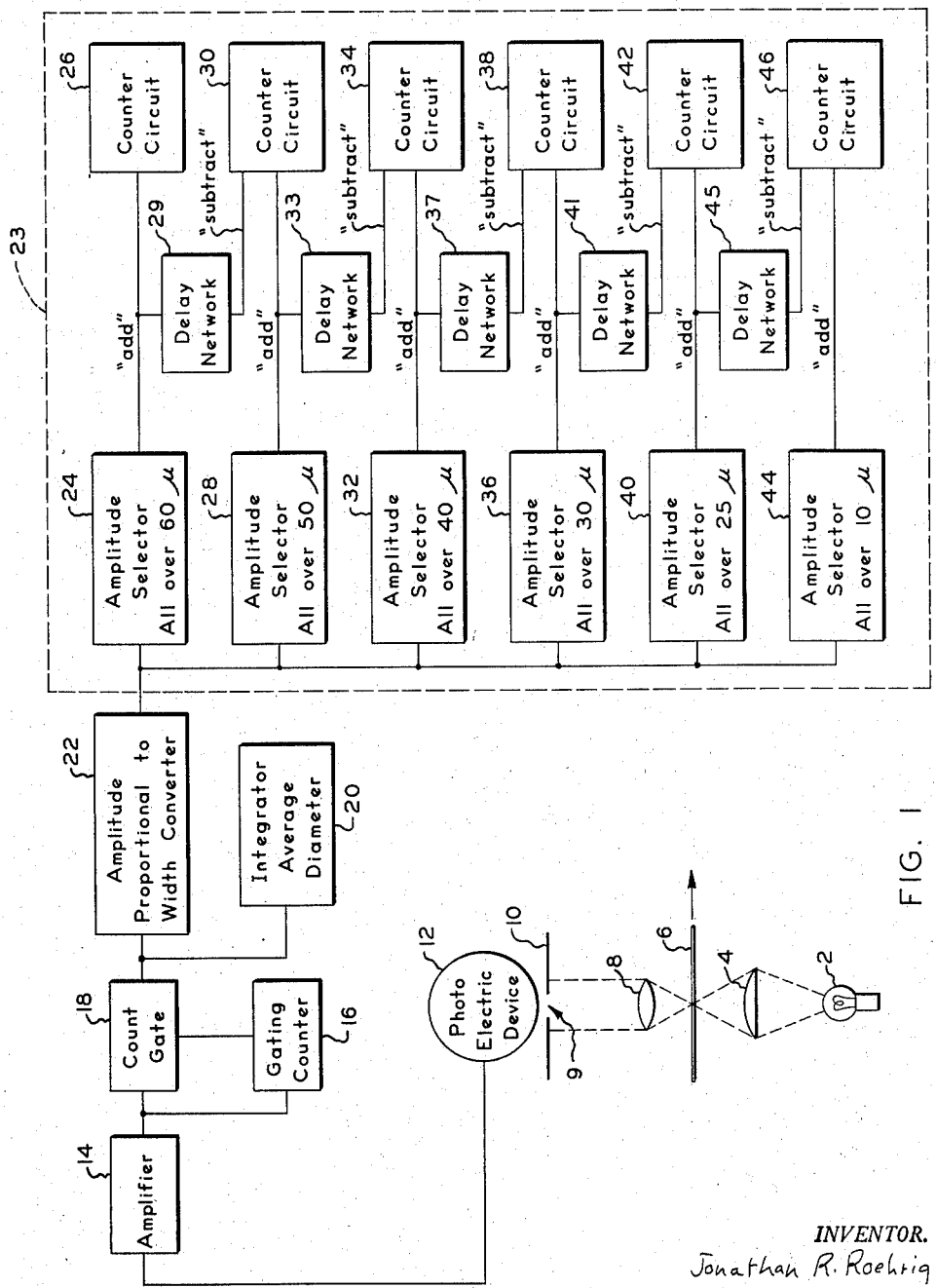
Figure 2:
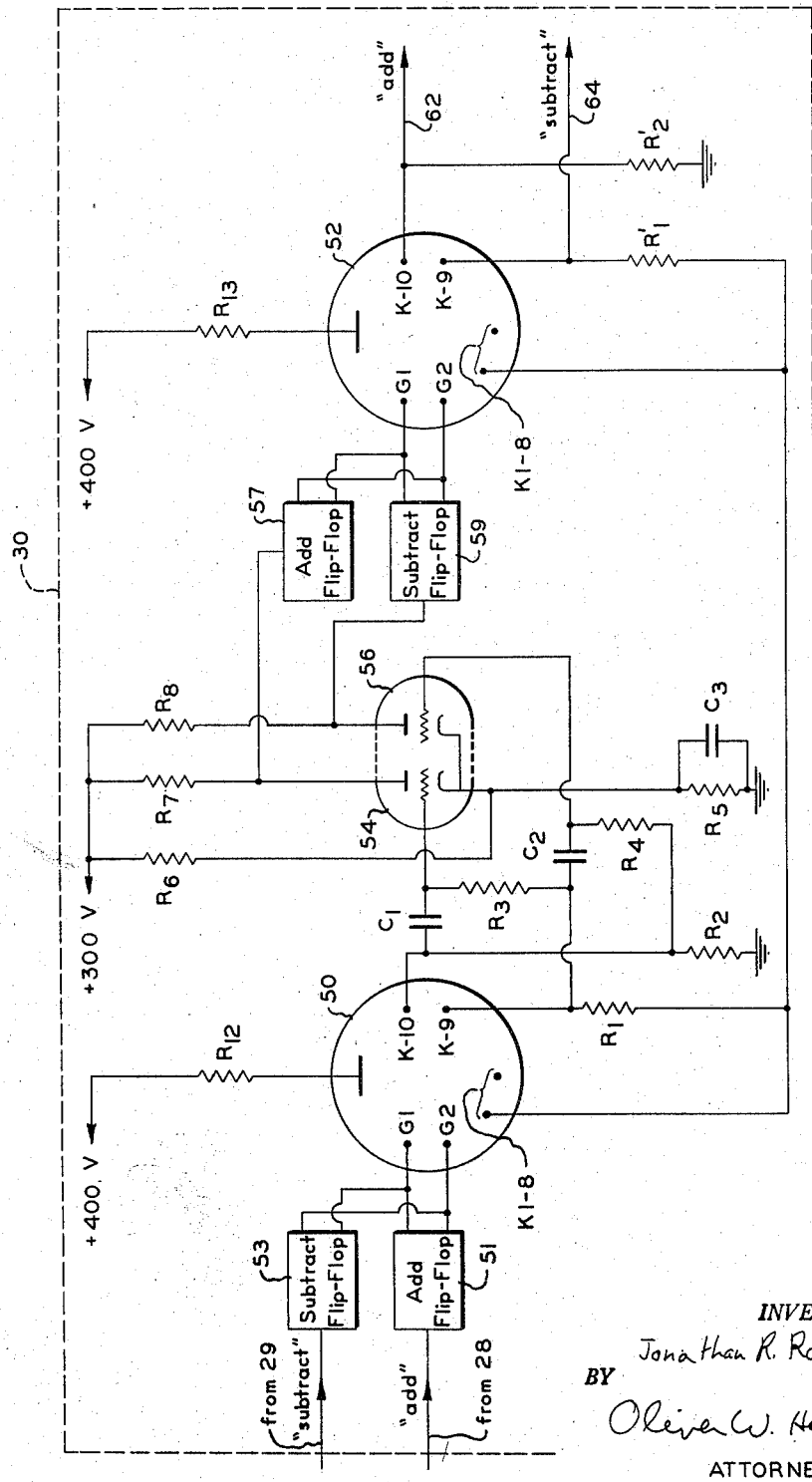

For a fuller understanding of the nature and objects of the invention, reference should be had to the following detailed description taken in connection with the accompanying drawings wherein:

Fig. 1 is a diagrammatic, schematic view of one preferred embodiment of the invention; and Fig. 2 is a diagrammatic, schematic view of another preferred embodiment of the invention.

The present invention is primarily directed to improvements in circuits of the type shown in the copending application of Lawrance and Roehrig, Serial No. 399,011, filed December 18, 1953, now Patent No. 2,824,486. In a preferred embodiment of the Lawrance and Roehrig measuring device for ascertaining average fiber diameter size and diameter distribution, there is provided a mechanism for optically scanning groups of fibers aligned in a substantially parallel manner in the focal plane of an optical scanning system which includes a source of light, a lens system for forming a beam of light, a transparent support for holding the fibers to be scanned, and a photoelectric device whose electrical properties are changed when the illumination on the device is varied. As mentioned in the above Lawrance and Roehrig application, the scanning of the fibers arranged in a parallel manner produces an electrical signal from the photoelectric device. These electrical signals are suitably amplified width modulated signals which are utilized for operating circuits to indicate the average fiber diameter and the diameter distribution of the scanned fibers. The present invention is primarily directed to improved counter circuits and more particularly to an improved counter circuit which can both add and subtract, depending upon the type of signal fed thereto.

The width modulated signals are preferably converted to amplitude modulated signals so that the amplitude or peak of the signal becomes directly proportional to the diameter of the scanned fibers. The amplitude modulated signals are then subjected to a plurality of amplitude selectors. Each amplitude selector is adjusted to select all values of the incoming signals greater than its given or set amplitude. Since it is desirable to obtain a direct reading of the fiber diameter distribution, it is preferred that a signal of a given selected amplitude prevent indication of all signals of selected amplitudes less than the given signal. Thus, for example, in the system mentioned above, if a particular amplitude selector is arranged to select all signals corresponding to fiber diameters greater than 40 microns, the system is arranged to prevent an indication or counting by all those selectors such as the 30, 25 and 10 micron selectors which are susceptible to signals corresponding to lesser diameter fibers. The present invention is particularly directed to the means for achieving this direct indication of the actual fiber distribution.

Referring now to the drawings, there is illustrated one preferred embodiment of the invention. A suitable source of light 2 is provided for the optical scanning system. The light from this source is concentrated into a beam by means of a lens 4 which is of the converging or condensing type. The beam of light thus formed falls upon a transparent support 6 upon which is positioned a number of fibers aligned in a substantially parallel relationship. If desired, a polarizing filter may be provided in the optical system to assist in differentiating the fibers from the background in those cases which exhibit optical anisotropy. The beam of light passing from the lens 4 passes through the transparent support 6 holding the aligned fibers thereon so as to provide enlarged fiber images. The light from each fiber image is then directed by means of a lens 8, such as an objective lens, through a small slot or slit 9 in the shield 10 which limits the quantity of light admitted to the photoelectric device 12. Variation of illumination of the photoelectric device produced by the movement of the transparent support 6 with the aligned fibers thereon provides a signal which is a function of the fiber diameter. The width modulated electrical signals are preferably transmitted to a suitable amplifier 14 where they are amplified and thereafter fed to a gating counter 16, a counter gate 18, an integrating average diameter measuring circuit 20, and a circuit 22 for converting width modulated signals to amplitude modulated signals. These elements are similar to those mentioned in the above copending application of Lawrance and Roehrig.

The diameter distribution of the fibers is preferably obtained by means of the counting circuit generally indicated at 23, which includes a number of amplitude selector circuits 24, 28, 32, 36, 40 and 44 which actuate a number of associated counter circuits 26, 30, 34, 38, 42 and 46. As indicated in the drawings, amplitude selector 24 is arranged to pass all signals having an amplitude corresponding to a fiber diameter greater than 60 microns. Similarly, amplitude selector 28 passes all signals having an amplitude corresponding to a fiber diameter greater than 50 microns. It is obvious that any number of fiber diameter groupings can be chosen which is most suitable. Equally, by use of proper switches, larger or smaller groupings can be obtained from a given basic counter circuit.

Amplitude selection may be satisfactorily obtained by using the broken-line characteristics of diodes. In the present case, it is desired that the amplitude selection be of all values of the input signal greater than a given amplitude. However, if desired, it is also possible to select all values of the input signal less than a given amplitude or between two amplitudes.

Since it is highly desirable to have the counter circuits give direct readings of the fiber distribution, the over-all circuit is arranged so that only one counter circuit is energized per signal. This is achieved by having the signal passed by each amplitude selector fed to a delay network which will feed a "subtract" signal to the next succeeding amplitude selector. Thus, assume that an amplitude signal corresponding to a fiber diameter greater than 60 microns is fed to the over-all counter circuit. This will pass through the amplitude selector 24. It will also pass through each of the other amplitude selectors 28, 32, 36, 40 and 44. Since it is desired to activate only counter circuit 26, it is necessary that signals fed to all of the other counter circuits be subtracted so that there will be no net counting in these other circuits. This is achieved by providing delay networks 29, 33, 37, 41 and 45, each of these delay networks providing a second pulse to its associated counter circuit to "subtract" a previous "add" pulse.

Referring now to Fig. 2, there is illustrated in greater detail the operation of a specific counter circuit embodying the present invention. For convenience, only one counter circuit 30 has been shown in Fig. 2, this being representative of the other circuits. Equally, the counter circuit of Fig. 2 shows only two decade counters while many more can be provided. The counter circuit 30 is arranged to add when it receives an "add" pulse from the amplitude selector 28 and to "subtract" when it receives a pulse from the delay network 29. This is accomplished by feeding the "add" pulse from amplitude selector 28 to an "add" flip-flop circuit 51 associated with decade counter 50. Similarly, a "subtract pulse is fed to a flip-flop circuit 53 also associated with decade counter 50 but arranged to feed an opposite type of signal to counter 50. The flip-flop circuits 51 and 53 are preferably monostable multivibrators of the type described in chapter 5 of "Waveforms," Massachusetts Institute of Technology, Radiation Laboratory Series, McGraw-Hill Book Company, published 1949.

As illustrated in Fig. 2, there are provided at least two of the bidirectional decade counters 50 and 52. Examples of preferred decade counters are those identified as GC10/4B glow tubes, which include a centrally positioned anode surrounded by a number of evenly spaced stable cathodes (K1–K10) and a plurality of unstable cathodes schematically indicated as controls G1 and G2. In order to make such a tube "add," a pair of spaced pulses is applied to the controls G1 and G2, a pulse being first applied to G1 and being followed a short time later (e. g., 50 microseconds) by a second pulse applied to G2. This causes the glow in the counter to advance one step in the direction from K1 to K10. A pair of pulses applied to the tube in the reverse order (e. g., to G2 first and then to G1) will cause the glow in the counter to move one step in the opposite direction so as to "subtract" rather than "add."

The present invention provides both addition and subtraction for the counter circuit by making the operation of the second decade counter 52 dependent upon the direction of counting of the first decade counter 50. This is preferably achieved by providing between these counters a double amplifier circuit 54—56 which will feed either an add or subtract pair of pulses to the following decade counter, depending upon the direction of count of the first decade counter 50. As can be seen, a glow on cathode K9 of counter 50 will generate a voltage across R1, this voltage being applied as a pedestal to the grid of "add" amplifier 54. This pedestal voltage will partially overcome the cathode bias generated across R5. When the glow shifts from K9 to K10 cathode, an additional pulse is generated across R2 and is fed to the grid of amplifier 54, this additional pulse being added to the decaying pedestal voltage previously generated across R1. The total of these two voltages overcomes the cut-off bias of tube 54 so that plate current flows and a pulse is generated across R7, this pulse being fed to an "add" flip-flop 57. The flip-flop circuit 57 feeds a first pulse to G1 of the second decade counter 52 and also provides a second pulse a short time later (e. g., 50 microseconds), this second pulse being fed to control G2 so as to cause the glow in decade counter 52 to "add" one unit.

The reverse sequence takes place when the first decade counter is subtracting. For example, if the glow first appears on K10, having moved from K1, a voltage drop is developed across R2 which is applied as a pedestal to the grid of amplifier 56. Shift of the glow from K10 to K9 develops a triggering additional pulse across R1 which, when added to the decaying R2 pedestal voltage, is sufficient to fire the amplifier 56. This develops a voltage across R8, thereby feeding a pulse to "subtract" flip-flop circuit 59. This creates a first pulse which is fed to G2 of counter 52. A second pulse is also fed from flip-flop 59 to G1, thus causing the glow in counter 52 to rotate in the "subtract" direction. Flip-flop circuits 57 and 59 are preferably similar to flip-flop circuits 51 and 53.

While only two counter tubes have been shown in Fig. 2, it is apparent that more than two may be employed. The output of counter tube 52, through leads 62 and 64, can serve to control the "adding" and "subtracting" of a subsequent tube or tubes. Naturally, it is highly desirable that the counter tubes 50 and 52 be arranged as decade counters so that no calculation is necessary to obtain the information therefrom. However, these tubes can be other than decade counters. For example, they might count 8, 12 or some other number for each revolution. While flip-flop circuits have been shown as preferred examples of delay networks in providing a double pulse to be fed to the inputs of the decade counters, other delay networks of a mechanical or electronic nature can be provided. Additionally, as mentioned previously, the counter can be arranged so as to count from the smallest particles to the largest particles rather than from the largest to the smallest, as shown in Fig. 1.

In one preferred embodiment of the invention, the components used in Fig. 2 having the following values:

*Size of components*

| | |
|---|---|
| $R_1$ | 67K |
| $R_2$ | 67K |
| $R_3$ | 1 meg |
| $R_4$ | 1 meg |
| $R_5$ | 10K |
| $R_6$ | 200K |
| $R_7$ | 100K |
| $R_8$ | 100K |
| $R_{12}$ | 470K |
| $R_{13}$ | 470K |
| $C_1$ | .001 µf |
| $C_2$ | .001 µf |
| $C_3$ | 10 µf |

Tube 54—56 is one 12Ax7.

Since certain changes may be made in the above apparatus without departing from the scope of the invention herein involved, it is intended that all matter contained in the above description, or shown in the accompanying drawing, shall be interpreted as illustrative and not in a limiting sense.

What is claimed is:

1. Apparatus for measuring the average diameter and diameter distribution of fibers which comprises a photoelectric scanning means for producing electrical pulses, the widths of which are directly proportional to the diameters of the fibers scanned, means for amplifying said electrical pulses, counting means controlled by said pulses for determining the number of fibers scanned, a plurality of selector means, each selector means being arranged to select pulses of predetermined minimum dimensions, counting means controlled by each selector means for determining the number of pulses selected, and means connected to the counting means for subtracting a pulse which is also selected by a selector means selective to a different pulse, each said counting means includes a first bidirectional decade glow counter tube, means for feeding a pair of spaced pulses to said first counter tube to cause said counter tube to add or subtract, depending upon the sequence of said spaced pulses, two pulse circuits connected to the output of said first counter tube, one pulse circuit being arranged to generate an "add" pair of pulses whenever the first counter tube counts from 9 to 10, the other pulse circuit being arranged to generate a "subtract" pair of pulses whenever the first counter tube counts from 10 to 9, and a second counter tube whose operation is controlled by the "add" and "subtract" pulses generated by the two pulse circuits.

2. Apparatus for measuring the average diameter and diameter distribution of fibers which comprises a photoelectric scanning means for producing electrical pulses, the widths of which are directly proportional to the diameters of the fibers scanned, means for amplifying said electrical pulses, counting means controlled by said pulses for determining the number of fibers scanned, a plurality of selector means, each selector means being arranged to select pulses of predetermined minimum dimensions, counting means controlled by each selector means for determining the number of pulses selected, and means connected to the counting means for subtracting a pulse which is also selected by a selector means selective to a different pulse, each said counting means includes a first bidirectional decade glow counter tube, means for feeding a pair of spaced pulses to said first counter tube to cause said counter tube to add or subtract, depending upon the sequence of said spaced pulses, a double pulse circuit connected to the output of said first counter tube, the pulse circuit being arranged to generate an "add" pair of pulses whenever the first counter tube counts from 9 to 10, the pulse circuit being arranged to generate a "subtract" pair of pulses whenever the first counter tube counts from 10 to 9, and a second counter tube whose operation is controlled by the "add" and "subtract" pulses generated by the pulse circuit.

3. Apparatus for measuring the average diameter and diameter distribution of fibers which comprises a photoelectric scanning means for producing electrical pulses, the widths of which are directly proportional to the diameter of the fibers scanned, means for amplifying said electrical pulses, counting means controlled by said pulses for determining the number of fibers scanned, a plurality of selector means, each selector means being arranged to select pulses of predetermined minimum dimensions, counting means controlled by each selector means for determining the number of pulses selected, and means connected to the counting means for subtracting a pulse which is also selected by a selector means selective to a different pulse, said counting means including a pair of decade counters and means for controlling the operation of the second decade counter as a function of the operation of the first decade counter, said means comprising a first delay circuit for feeding an "add" pair of pulses to the second decade counter and a second delay circuit for feeding a "subtract" pair of pulses to the second decade counter.

References Cited in the file of this patent
UNITED STATES PATENTS

| | | |
|---|---|---|
| 2,470,926 | Gieseke | May 24, 1949 |
| 2,636,983 | Poole | Apr. 28, 1953 |
| 2,646,926 | Young et al. | July 28, 1953 |
| 2,653,231 | Cooke-Yarborough | Sept. 22, 1953 |
| 2,679,978 | Kandiah | June 1, 1954 |
| 2,784,910 | Ghiorso et al. | Mar. 12, 1957 |

FOREIGN PATENTS

| | | |
|---|---|---|
| 724,209 | Great Britain | Feb. 16, 1955 |

OTHER REFERENCES

"Measurement of Size-Distribution of Spray Particles," by Wheeler et al., Electronic Engineering, October 1953; pages 402 thru 406.